United States Patent
Bögel

(10) Patent No.: US 7,543,391 B2
(45) Date of Patent: Jun. 9, 2009

(54) LEVELING, PLUMBING, AND ANGULAR CALIBRATION INSTRUMENT WITH A SWINGING SUSPENDED VERTICAL BODY

(75) Inventor: Gerhard Bögel, Balgach (CH)

(73) Assignee: Leica Geosystems AG, Heerbrugg (CH)

( * ) Notice: Subject to any disclaimer, the term of this patent is extended or adjusted under 35 U.S.C. 154(b) by 0 days.

(21) Appl. No.: 12/030,220

(22) Filed: Feb. 13, 2008

(65) Prior Publication Data
US 2008/0189966 A1    Aug. 14, 2008

(30) Foreign Application Priority Data
Feb. 13, 2007   (DE)   ........................ 10 2007 007 084

(51) Int. Cl.
*G01C 15/00*   (2006.01)
*G01B 5/24*    (2006.01)

(52) U.S. Cl. ............................. 33/286; 33/391; 33/402

(58) Field of Classification Search ................... 33/286, 33/290–291, 391–402
See application file for complete search history.

(56) References Cited

U.S. PATENT DOCUMENTS

| | | | |
|---|---|---|---|
| 6,306,126 B1 | 10/2001 | Moctezuma | |
| 6,964,106 B2 * | 11/2005 | Sergyeyenko et al. | 33/286 |
| 7,121,012 B2 * | 10/2006 | Voecks | 33/345 |
| 7,155,835 B2 * | 1/2007 | Hayes et al. | 33/286 |
| 2003/0000094 A1 * | 1/2003 | Tamamura | 33/286 |
| 2003/0029049 A1 * | 2/2003 | Huang et al. | 33/286 |
| 2004/0172836 A1 * | 9/2004 | Ng et al. | 33/286 |
| 2006/0080849 A1 | 4/2006 | McCarty | |
| 2008/0028624 A1 * | 2/2008 | Chen | 33/286 |

FOREIGN PATENT DOCUMENTS

DE    19842798    5/2000

* cited by examiner

*Primary Examiner*—Yaritza Guadalupe-McCall
(74) *Attorney, Agent, or Firm*—Workman Nydegger

(57) ABSTRACT

In a leveling, plumbing, and angular calibration instrument a swinging suspended vertical body (4) is provided, which carries groups (5, 6) of light elements and/or lenses and optionally a beam splitter and/or beam converging element provided to create and emit laser light. A clamping element (7) is allocated to the vertical body (4) to block a swinging motion in an exactly central position, if necessary, which is formed from two clamping shoes (8, 9) arranged opposite each other, which can be synchronously displaced in reference to the clamping section (10) of the vertical body (4).

22 Claims, 2 Drawing Sheets

Fig. 1
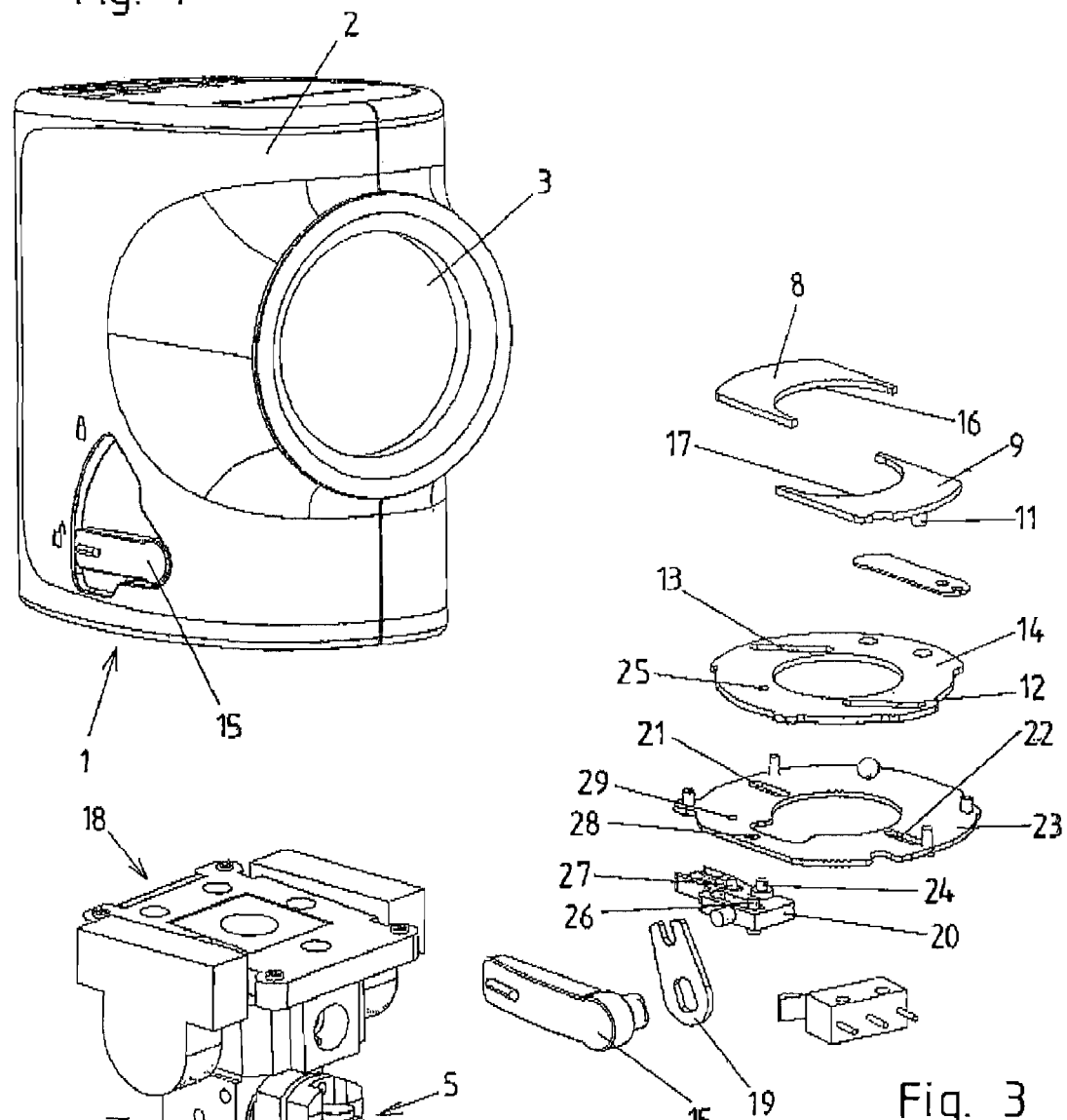
Fig. 3
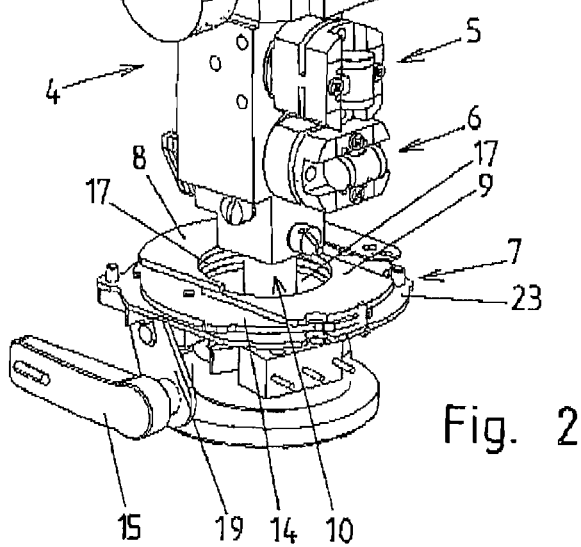
Fig. 2

LEVELING, PLUMBING, AND ANGULAR CALIBRATION INSTRUMENT WITH A SWINGING SUSPENDED VERTICAL BODY

CROSS-REFERENCE TO RELATED APPLICATIONS

This application claims the benefit of DE 10 2007 007 084.7, filed Feb. 13, 2007, which is incorporated by reference herein as if fully set forth.

BACKGROUND OF THE INVENTION

The invention relates to a leveling, plumbing, and angular calibration instrument with a swinging suspended vertical body, which carries light elements and/or lenses and perhaps means for beam splitting and/or for converging light for the creation and emission of laser light with means to limit and/or block the swinging motion being allocated to the vertical body.

In various leveling, plumbing, and angular calibration instruments vertical bodies or plumb bobs are provided, which are suspended like a universal joint or via a ball joint. Sometimes the swinging motion is dampened by the use of magnets. Another known instrument provides for a plumb bob having a hemispherical clamping body in the proximity of the suspension site. Using a slide, a socket-like part must be moved upward to serve as a clamp. The common application of linear lasers is to project a horizontal and usually also a vertical line to the opposite wall, seen from the location of the instrument. An extraordinary application is characterized in that it is sufficient to show a 90° interface at an arbitrary height, i.e. no longer located in the horizontal line determined by the plumb bob. When in the known embodiment the vertical body is clamped with the hemispherical clamping body, while the instrument housing is positioned inclined, i.e. after the removal from a tripod or when being lifted off the ground, the vertical body in the instrument housing is also arranged in an inclined position. The axis of the vertical body is then no longer parallel to the exterior edge of the instrument housing. In spite of an expensive mechanism one important additional function is aggravated or has become impossible. This known instrument is even provided with an oscillation axis and with a guidance housing, but in spite thereof the user can project interfaces, i.e. intersections of a horizontal and a vertical line failing to intersect at precisely 90°. This potential source for errors is even more serious when slight deviations from 90° can no longer be safely detected by the naked eye.

SUMMARY

The invention seeks to provide an instrument of the type mentioned at the outset having means for blocking the swinging motion such that blocking can always occur at a predetermined position, preferably precisely at a centered position of the vertical body.

According to the invention, the vertical body is allocated to a clamping element preventing the swinging motion at a predetermined position, when necessary, which is formed from at least two opposite arranged clamping shoes that can be displaced or pivoted, or displaced and pivoted in an asynchronous manner in reference to the clamping section of the vertical body.

According to another aspect of the invention, at least one clamping element for a clamped fixation of the vertical body is provided at a predetermined position, formed from at least two clamping shoes arranged opposite each other, which can be displaced or pivoted, or displaced and pivoted in an asynchronous manner in reference to the clamping section of the vertical body.

Thus, the invention always allows a clamping of the vertical body at a predetermined position during clamping, preferably at its central position. Here, it is irrelevant if the vertical body is already positioned in its central position or is deflected at an acute angle. Due to the fact that the clamping shoes can always be brought into an identical clamping position the vertical body is brought into this predetermined position before the clamping shoes affect the clamping action.

Thus, according to the invention the vertical body is automatically centered by the clamping shoes, regardless of whether the device is aligned horizontally or if it is being removed from the projection site and is therefore moved diagonally in space. For example, when the instrument in a horizontal housing points upwards the intersection between the higher aligned horizontal line and the vertical line is automatically vertical.

Operating with a fixed vertical body is even further supported by a second measure of the present invention. It has already been common practice in automatic rotation lasers to indicate by the laser point blinking that the laser is operated outside the target range and/or that it has not been horizontally aligned. An instrument not equipped according to the invention having a diagonally positioned, clamped vertical body may also cause the laser and thus also the laser lines to blink. In the long run, such blinking is not only aggravating but also tiresome for the eyes. However, in an embodiment according to the present invention, operation can occur with constant lighting when the vertical body is fixed in a perfectly centered position.

The present invention therefore provides a centering of the vertical body by fixing it between two contacting clamping shoes. When the instrument is subjected to acceleration, e.g., by a hard placement onto a concrete surface or even a fall from a low height, the entire vertical body can move axially, i.e. including the universal joint. The important advantage of this arrangement is a force reduction immediately affecting the ball bearings. This way it is ensured that the oscillating behavior of the bearings remains unchanged. The projection of a vertical line, horizontal within a predetermined tolerance range, depends on the precise return to a swinging position (gravity plumb bob). Excessive bearing forces can deform the running surfaces and lead to impressions in the running surfaces, which in turn could results in errors of the swinging position. However, this can be prevented by the use of the measures according to the invention.

Further it is provided that two opposite positioned, plate-shaped clamping shoes can be displaced in a guide arrangement in a shifting manner synchronous in the direction of the clamping section of the vertical body and away therefrom. This is a simple constructive design, which is also equivalently robust and thus not prone to malfunctions.

In order for the drive of the clamping shoes to occur in a simple manner such that primarily the synchronization of the movement of the clamping shoes can be well ensured, it is suggested that the clamping shoes are provided with protruding bolts, which engage the guidance slots of a rotary operating disk causing the displacement motion of the clamping shoes. This way a simple sliding drive is possible for the clamping shoes, which can be held securely in straight guidance grooves.

The centering of the vertical body is ensured when the clamping shoes are provided with an arched, preferably semi-circular recess at the engaging end facing the clamping section of the vertical body. Even when the vertical body is not located in the centered position it is pushed into said centered position by the recesses at the engaging end and/or pivoted around the swinging suspension of the vertical body.

Another design solution having the same effect is achieved when the clamping shoes are provided at their engaging end facing the clamping section of the vertical body with a V-shaped or multi-faceted recess.

In order to allow the clamping to be executed in a simple manner by an operator of the leveling, plumbing, or angular calibration instrument from the outside it is provided that the operating disk for the displacement motion of the clamping shoes effectively contacting a switching lever accessible from the outside of the instrument. Therefore, the instrument can be switched from an unlocked into a locked position from the outside of the instrument, with the switch lever triggering the necessary movement of the clamping shoes, which is caused only by the switch.

It is further suggested that the clamping section of the vertical body and thus the clamping shoes are embodied and/or arranged at a distance, however in the proximity of the free end section of the vertical body. This way an optimal arrangement is achieved, because at an appropriate distance from the suspension of the vertical body the clamping shoes have to transfer even the slightest forces possible.

No special embodiment of the clamping section is necessary, because a simple clamping can occur by the clamping shoes. Therefore, a beneficial embodiment comprises for the clamping section of the vertical body to be an essentially cylindrical or multi-faceted section. Thus, only one section must be embodied free from any other protruding parts.

In this context, it is advantageous when the clamping section of the vertical body is provided with an elastic coating, e.g., a rubber coating. This results in the contacting clamping shoes not hindering the axial motion of the vertical body—holders located in generously sized rubber molding parts. Additionally, no noise develops by the clamping shoes contacting the clamping section when shock or minor vibrations occur.

BRIEF DESCRIPTION OF THE DRAWINGS

In the following description additional features and particular advantages of the invention are explained in greater detail using the drawing.

In the drawings:

FIG. 1 is a diagonal view of a leveling, plumbing, and angular calibration instrument;

FIG. 2 is a diagonal view of a vertical body inserted in a leveling, plumbing, and angular calibration instrument and a clamping elements blocking a swinging motion of the vertical body, when necessary;

FIG. 3 is an exploded view of the parts of the clamping element;

DETAILED DESCRIPTION OF THE PREFERRED EMBODIMENTS

Figure 4:
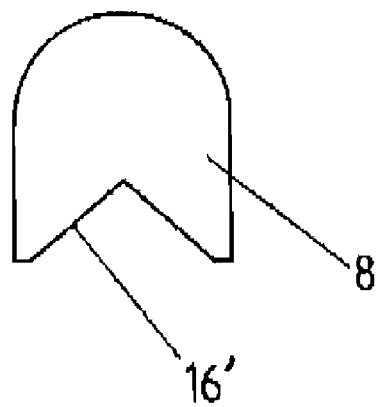
FIG. 4 is a plan view of an alternate embodiment of a clamping shoe.

In FIG. 1, a leveling, plumbing, and angular calibration instrument 1 is shown, with in this illustration only the actual housing 2 being discernible, of course. Via an opening 3 in the housing 2, the laser beams are guided to the outside having an appropriate direction and intensity and are shown, for example, at a wall opposite the instrument in form of dots or lines or intersecting lines.

A vertical body 4 is suspended swinging in the housing 2. This vertical body 4 is provided with groups 5, 6 of light elements and/or lenses and perhaps means for beam splitting and/or beam converging for creating and emitting laser light. The vertical body 4 is additionally allocated to means limiting and/or blocking the swinging motion. Here, a clamping element 7 is allocated to the vertical body 4 to block the swinging motion, when necessary, in a predetermined position, preferably the exact central position, with the clamping element comprising at least by two clamping shoes 8 and 9 arranged opposite in reference to each other, which synchronously can be displaced and/or pivoted in reference to a clamping section 10 of the vertical body 4. In the drawing, an embodiment is shown in which two different clamping shoes 8 and 9 are provided. It would also be possible to arrange more than two such clamping shoes, angularly off-set in reference to each other, so that three, four, or more such clamping shoes may be provided as well.

Within the scope of the invention it is also possible, instead of clamping shoes, displaceable in a straight line, to provide clamping shoes pivotal around one or more axes, with then only the structural means for the pivotal motion require adjustment.

In the design shown in the drawing, two plate-shaped clamping shoes 8 and 9 positioned opposite each other can be synchronously displaced in a guide arrangement in the direction of the clamping section 10 of the vertical body and away therefrom.

The protruding bolt 11 of each of the clamping shoes 8 and 9 engages in a guidance slot 12, 13 of a rotary operating disk 14. Rotating the operating disk 14 causes the displacement motion of the clamping shoes 8, 9. The protruding bolt 11 of each of the clamping shoes 8, 9 further engages in a guidance slot 21, 22 in a stationary disk 23 for guiding the displacement motion of the clamping shoes 8, 9 when the operating disk 14 is rotated.

For the rotation of the operating disk 14, the operating disk 14 is in working connection with a switching lever 15, accessible from outside of the instrument 1, and thus operable from outside the housing 2. The switching lever 15 engages a transfer member 20 via another lever 19. The transfer member 20 in turn engages the operating disk 14 via a bolt 24 which projects into a hole 25 of the operating disk 14. The bolt 24 is displaceable relative to the transfer member 20 in a direction which is parallel to the axis of rotation of the switching lever 15. For this, the bolt 24 projects through an elongated hole in the transfer member 20 which is open to a side face of the transfer member 20.

Bolts 26 and 27 engage in holes 28, 29 of the stationary disk 23 and project through elongated holes in the transfer member 20. Through this arrangement, the transfer member 20 is displaceable relative to the stationary disk.

When the switching lever 15 is operated, the transfer member 20 is shifted relative to the stationary disk 23 and the operating disk 14 is rotated and by this, the clamping shoes 8 and 9 are displaced.

The operating disk 14 and the stationary disk 23 are parallel to each other and preferably abut each other.

At the engaging end, facing the clamping section 10 of the vertical body 4, the clamping shoes 8 and 9 are provided with an arched, preferably semi-circular recess 16 and/or 17. The clamping section 10 can therefore be better engaged and be brought into the centered position in which then the clamping shoes 8 and 9 can duly hold the clamping section 10 in the desired position.

Figure 5:
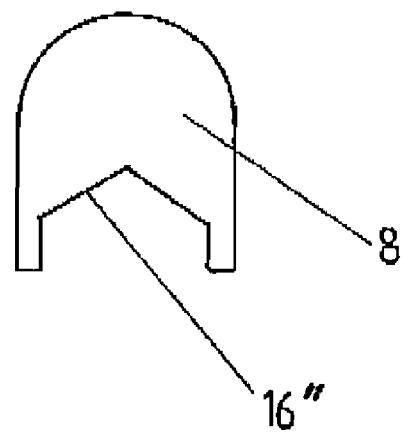
FIG. 5 is a plan view of another embodiment of a clamping shoe.

Within the scope of the invention it is also possible, instead of an arched recess 16 and/or 17, to provide the clamping shoes 8 and 9 with a V-shaped recess 16' as shown in FIG. 4, or a multi-faceted recess 16" as shown in FIG. 5, at their end facing the clamping section 10 of the vertical body 4 for said engagement. FIGS. 4 and 5 only show one clamping shoe 16', 16", and it will be understood by the person of ordinary skill in the art that the opposite clamping shoe would have a corresponding shape. It is also possible to provide several consecutive recesses, limited in a different arc-shaped manner. The boundaries of the recesses 16 and/or 17 may also be plain or roughened or spiky.

Of course, the embodiment of the clamping section 10 at the vertical body 4 can also be arranged somewhere on the vertical body 4. Advantageously, the arrangement of the clamping section 10 and thus the clamping element 7 with the clamping shoes 8 and 9 are at a distance, however in close proximity to the free end section of the vertical body 4. Therefore a relatively large distance is given to the universal-joint like suspension 18 so that the holding and clamping of the vertical body 4 can occur even easier.

Figure 6:
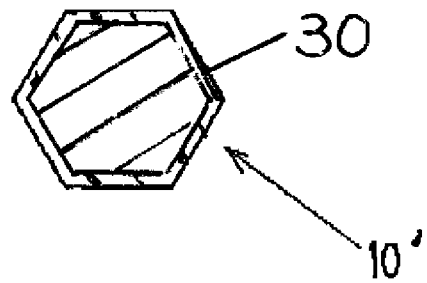
FIG. 6 is a cross-sectional view of the clamping section used with the clamping shoe of FIG. 5.

In a simple manner the clamping section 10 of the vertical body 4 represents an essentially cylindrical section, as shown in FIG. 2, or a or multi-faceted section 10', as shown in FIG. 6, which would be used in connection with clamping shoes 8, 9 with a recess 16" as shown in FIG. 5. Here, it is beneficial when the clamping section 10 of the vertical body 4 is provided with an elastic coating 30, e.g., a rubber coating.

Within the scope of the invention, some design changes are possible, still requiring a clamping element as the essential measure that can hold the vertical body in a predetermined position, preferably exactly in the central position. However, it is also possible to provide other predetermined positions for certain useful purposes, in which the vertical body can be held. This only requires, for example, a particular adjustment and arrangement of the clamping element 7.

LEGEND OF THE REFERENCE CHARACTERS

1 instrument
2 housing
3 opening
4 vertical body
5 group (of light elements)
6 group (of light elements)
7 clamping element
8 clamping shoe
9 clamping shoe
10 clamping section
10' clamping section
11 bolt
12 guidance slot
13 guidance slot
14 operating disk
15 switching lever
16 recess
16' recess
16" recess
17 recess
18 suspension
19 lever
20 transfer member
21 slot
22 slot
23 disk
24 bolt
25 hole
26 bolt
27 bolt
28 hole
29 hole
30 elastic coating

The invention claimed is:

1. A leveling, plumbing, and angular calibration instrument (1) comprising:
a swinging suspended vertical body (4), which for creation and emission of laser light carries at least one of a light element, lens, beam splitter, or beam converging element;
a clamping arrangement allocated to the vertical body (4) for limiting or blocking the swinging motion, having a clamping element (7) allocated to the vertical body (4) preventing the swinging motion at a predetermined position, when necessary, which includes at least two clamping shoes (8, 9) arranged opposite in reference to each other, which are synchronously displaceable or pivotal, or displaceable and pivotal in reference to a clamping section (10) of the vertical body (4).

2. A leveling, plumbing, and angular calibration instrument according to claim 1, wherein the at least two clamping shoes comprise two plate-shaped clamping shoes (8, 9) located opposite each other that are displaceable in a guide arrangement for synchronous displacement in a direction of the clamping section (10) of the vertical body (4), and away therefrom.

3. A leveling, plumbing, and angular calibration instrument according to claim 1, wherein the clamping shoes (8, 9) are provided with protruding bolts (11) that engage in guidance slot (12, 13) of a rotary operating disk (14) for creating a displacement motion of the clamping shoes (8, 9).

4. A leveling, plumbing, and angular calibration instrument according to claim 3, wherein the operating disk (14) is in working connection to a switching lever (15) accessible from outside of the instrument for creating the displacement motion of the clamping shoes (8, 9).

5. A leveling, plumbing, and angular calibration instrument according to claim 3, wherein the protruding bolts (11) of the clamping shoes (8, 9) engage in guidance slots (21, 22) in a stationary disk (23) for guiding the displacement motion of the clamping shoes (8, 9).

6. A leveling, plumbing, and angular calibration instrument according to claim 1, wherein the clamping shoes (8, 9) are provided at engaging ends thereof that face the clamping section (10) of the vertical body (4), with an arc-shaped or semi-circular recess (16, 17).

7. A leveling, plumbing, and angular calibration instrument according to claim 1, wherein the clamping shoes (8, 9) are provided at engaging ends thereof facing the clamping section (10) of the vertical body (4), with a V-shaped or multi-faceted recess (16, 17).

8. A leveling, plumbing, and angular calibration instrument according to claim 1, wherein the clamping section (10) of the vertical body (4) and thus the clamping shoes (8, 9) are provided at a distance but in proximity to a free end section of the vertical body (4).

9. A leveling, plumbing, and angular calibration instrument according to claim 1, wherein the clamping section (10) of the vertical body (4) is an essentially cylindrical or multi-faceted section.

10. A leveling, plumbing, and angular calibration instrument according to claim 1, wherein the clamping section (10) of the vertical body (4) includes an elastic coating.

11. A leveling, plumbing, and angular calibration instrument according to claim 1, wherein the clamping element (7) prevents the swinging motion of the vertical body (4) exactly in a central position.

12. A leveling, plumbing, and angular calibration instrument comprising:
- a swinging suspended vertical body (4) which carries at least one element for the creation and emission of laser light, selected from a group comprising light elements, lenses, beam splitters and beam converging elements;
- a clamping arrangement for limiting or blocking a swinging motion allocated to the vertical body (4), and including at least one clamping element (7) for clamping the vertical body (4) at a predetermined position, the at least one clamping element including at least two clamping shoes (8, 9) arranged opposite in reference to each other, which are synchronously displaceable or pivotal or displaceable and pivotal in reference to a clamping section (10) of the vertical body (4).

13. A leveling, plumbing, and angular calibration instrument according to claim 12, wherein the at least two clamping shoes comprise two opposite plate-shaped clamping shoes (8, 9) that are synchronously displaceable in a guidance arrangement in a direction to the clamping section (10) of the vertical body (4) and away therefrom.

14. A leveling, plumbing, and angular calibration instrument according to claim 12, wherein the clamping shoes (8, 9) are provided with protruding bolts (11), which engage guidance slots (12, 13) of a rotational operating disk (14) causing a displacement motion of the clamping shoes (8, 9).

15. A leveling, plumbing, and angular calibration instrument according to claim 14, wherein the operating disk (14) for the displacement motion of the clamping shoes (8, 9) is in working connection with a switching lever (15) accessible from outside of the instrument.

16. A leveling, plumbing, and angular calibration instrument according to claim 14, wherein the protruding bolts (11) of the clamping shoes (8, 9) engage in guidance slots (21, 22) in a stationary disk (23) for guiding the displacement motion of the clamping shoes (8, 9).

17. A leveling, plumbing, and angular calibration instrument according to claim 12, wherein the clamping shoes (8, 9) are provided at engaging end thereof facing the clamping section (10) of the vertical body (4), with an arc-shaped or semi-circular recess (16, 17).

18. A leveling, plumbing, and angular calibration instrument according to claim 12, wherein the clamping shoes (8, 9) are provided at engaging ends thereof facing the clamping section (10) of the vertical body (4), with a V-shaped or multi-faceted recess (16, 17).

19. A leveling, plumbing, and angular calibration instrument according to claim 12, wherein the clamping section (10) of the vertical body (4) and the clamping shoes (8, 9) are provided at a distance but in proximity to free end section of the vertical body (4).

20. A leveling, plumbing, and angular calibration instrument according to claim 12, wherein the clamping section (10) of the vertical body (4) is essentially a cylindrical or multi-faceted section.

21. A leveling, plumbing, and angular calibration instrument according to claim 12, wherein the clamping section (10) of the vertical body (4) includes an elastic coating.

22. A leveling, plumbing, and angular calibration instrument according to claim 12, wherein the clamping element (7) fixes the vertical body (4) in an exactly central position.

* * * * *